United States Patent

Croix

[15] 3,637,477
[45] Jan. 25, 1972

[54] METHOD OF PREPARING OF $CF_3CHClOCHF_2$

[72] Inventor: Louise S. Croix, Summit, N.J.
[73] Assignee: Air Reduction Company, Incorporated, New York, N.Y.
[22] Filed: Feb. 20, 1970
[21] Appl. No.: 14,716

Related U.S. Application Data

[63] Continuation of Ser. No. 731,264, May 22, 1968, abandoned.

[52] U.S. Cl. ........................ 204/158 HA, 252/171, 252/364, 260/614 F, 424/342
[51] Int. Cl. ........................ C07c 41/04, C07c 41/12
[58] Field of Search ........................ 260/614 F; 204/158 HA

[56] References Cited

UNITED STATES PATENTS

2,452,944  11/1948  McBee et al. ........................ 260/614

FOREIGN PATENTS OR APPLICATIONS

523,449  7/1940  Great Britain

OTHER PUBLICATIONS

Park et al. I, J. Amer. Chem. Soc., 74, pp. 2292–2294 (1952).
Park et al. II, J. Amer. Chem. Soc., 76, pp. 1387–1388 (1954).
Park et al. III, J. Org. Chem., 23, pp. 1474–1475 (1958).
Henne et al., J. Amer. Chem. Soc., 72 pp. 4378–4380 (1950).
Corley et al., J. Amer Chem. Soc., 78 pp. 3489–3492 (1956).
Lovelace et al., Aliphatic Fluorine Compounds, Reinhold Publ. Co. N.Y. (1958) pp. 137–138, 159.
Morrison et al., Organic Chemistry, Allyn & Bacon, Buston (1966) p 563.

*Primary Examiner*—Howard T. Mars
*Attorney*—H. Hume Mathews and Edmund W. Bopp

[57] ABSTRACT

Trifluoroethanol, an alkali metal hydroxide, and difluorochloromethane are reacted to prepare 2,2,2-trifluoroethyl difluoromethyl ether which is recovered and chlorinated in the presence of photoenergy to prepare 1-chloro-2,2,2-trifluoroethyl difluoromethyl ether which exhibits excellent anesthetic properties in inhalation susceptible mammals.

4 Claims, No Drawings

METHOD OF PREPARING OF $CF_3CHClOCHF_2$

DESCRIPTION OF THE INVENTION

This invention relates to a method of preparing the compound 1-chloro-2,2,2-trifluoroethyl difluoromethyl ether. The compound 1-chloro-2,2,2-trifluoroethyl difluoromethyl ether has the following formula:

$$CF_3CHClOCHF_2$$

It is normally a clear, colorless liquid with a very slight odor. It has the following physical properties: b.p. 48.5° C. at 760 mm.; vapor pressure 330 mm. at 25° C.; specific gravity 1.45; refractive index $N_D{}^{20}$ 1.3002 and molecular weight 184.5. The compound is nonflammable, soda lime stable, and is a potent anesthetic for inhalation anesthetic susceptible mammals. The compound is also easily miscible with other organic liquids including fats and oils and has useful solvent properties, for example, as a solvent for fluorinated olefins and other fluorinated materials such as fluorowaxes. It may be used to prepare pastes and dispersions of such materials useful for coatings and the like and may be used as a degreasing agent.

According to the present invention, the preparation of 1-chloro-2,2,2-trifluoroethyl difluoromethyl ether is carried out in two steps, as follows:

a. 
b. $CF_3CH_2OCHF_2 + Cl_2 \rightarrow CF_3CHClOCHF_2$

The starting materials, trifluoroethanol $CF_3CH_2OH$, difluorochloromethane $CHF_2Cl$ (Freon 22) and the alkali metal hydroxides are all readily available commercially and require no special preparation or handling techniques.

The first step of the reaction can be carried out at temperatures from 0° C. up to approximately 150° C. The temperature of the reaction has a marked effect on the rate. The reaction will proceed at 0° C.; however, at temperatures lower than room temperature (25° C.) the reaction tends to be quite slow. At temperatures higher than 150° C. the alkali metal alcoholate which appears to form as an intermediate tends to decompose. The preferred temperature range is 80°–100° C. where the reaction proceeds at a rapid and controlled rate.

Since difluorochloromethane is a gas, the pressure of the reaction plays an important part in determining the rate of reaction and the efficiency. The reaction can be carried out over a range of pressure from atmospheric up to several hundred pounds per square inch. The choice of operating pressure depends on the equipment available and the rate of reaction and efficiency desired.

There are several advantages to be gained in carrying out the reaction at reasonably high pressures, for example, for a given amount of alcohol to be reacted, less difluorochloromethane is used since the reactants are confined in a closed volume and forced to react. At atmospheric pressure the difluorochloromethane enters the reaction zone and passes on through to the collection trap if not reacted immediately. The reaction is also much faster at higher pressures.

Any one of the alkali metal hydroxides, for example, lithium hydroxide, sodium hydroxide, potassium hydroxide, rubidium hydroxide and cesium hydroxide can be used in carrying out the reaction. Potassium and sodium hydroxide are preferred in view of their low cost, ready availability and ease of handling. The alkali metal hydroxide does not have to be in anhydrous condition and can be used directly from the shipping container, or in aqueous solution.

In the Journal of General Chemistry 29 1113–1117 (1959) L. Z. Soborovskii and N. F. Baina disclose the preparation of the difluoromethyl ether of methyl and butyl alcohols. In carrying out the reaction elemental sodium was used which requires great care in handling, and all of the reactants had to be maintained in anhydrous conditions, excluding all water. The yield for the reaction was relatively low. It was reported to be 23 percent.

In contrast to the work reported with elemental sodium, the reaction of the present invention can be carried out using alkali metal hydroxides and in the presence of water. The reaction is much smoother and free of bumping due to hydrogen evolution. Also, the yield of the reaction is substantially higher than that reported with average yields running from 38 to 56 percent of theoretical. Furthermore, water does not have to be precluded from the reaction mixture. In fact, the reaction can be carried out in the presence of water which appears to act as a beneficial solvent for all of the inorganic salts and helps to maintain a homogenous reaction mixture. A large excess of water should not be used as it tends to reduce the yield of the reaction.

In carrying out the first step of the reaction at atmospheric pressure the trifluoroethanol is placed in a flask and an amount of alkali metal hydroxide is dissolved in the alcohol. An excess of trifluoroethanol can be used as a solvent medium or solvents such as dioxane, acetonitrile and water can be employed. Since trifluoroethanol is a relatively expensive material it is preferred to use the other less expensive solvents.

A gas bubbler tube is then fitted to the flask containing the trifluoroethanol and alkali metal hydroxide. Approximately three times the amount of difluorochloromethane should be bubbled through the alcohol solution than is necessary for reacting with the alcohol and alkali metal hydroxide contained in the flask. The excess gas compensates for the material which merely passes through the vessel without reacting. The effluent from the flask should be connected to a cold trap where the excess difluorochloromethane and the product 2,2,2-trifluoroethyl difluoromethyl ether ($CF_3CH_2OCHF_2$) can be collected. After the reaction is completed the contents of the cold trap should be fractionally distilled in a low temperature multiplate fractionating apparatus in order to separate the $CF_3CH_2OCHF_2$, b.p. 29°–30° C. at 760 mm. The excess difluorochloromethane collected in the low temperature fractionation can be reused in subsequent reactions.

In carrying out the reaction at pressures greater than atmospheric, the trifluoroethanol and alkali metal hydroxide should be added to a metal container such as a stainless steel autoclave. Excess trifluoroethanol can be again used as a solvent or the other aforementioned solvents can be used. The difluorochloromethane can be added to the autoclave as a cold liquid or the autoclave can be sealed and the difluorochloromethane can be added as a gas. Since the autoclave is a closed vessel, a substantial excess of difluorochloromethane need not be added. The autoclave can then be heated and agitated under pressure until the reaction is complete. The autogenous pressure of the reactants is sufficient for pressurizing the autoclave. A large excess of difluorochloromethane can be added to substantially increase the pressure in the autoclave. The preferred operating pressure is between 100 and 300 pounds per square inch. The contents of the autoclave can then be fractionally distilled to collect the $CF_3CH_2OCHF_2$ intermediate and any difluorochloromethane which is unreacted.

Since the autoclave can be sealed, heated and pressurized, the rate of reaction in the autoclave will be substantially faster than the rate at atmospheric pressure. The usual autoclave reaction can be completed in 3 to 4 hours while the same reaction at atmospheric pressure would require 16–20 hours and a substantial excess of difluorochloromethane.

Following the completion of the first step of the reaction, whether carried out at atmospheric or at a high pressure, the intermediate 2,2,2-trifluoroethyl difluoromethyl ether ($CF_3CH_2OCHF_2$) should be added to a chlorination apparatus for the second step of the reaction.

The chlorination of $CF_3CH_2OCHF_2$ to form $CF_3CHClOCHF_2$ should be carried out in either a fully or partially transparent vessel so that photoenergy can be supplied to the reaction. Suitable sources of photoenergy are incandescent, ultraviolet and fluorescent lamps and even strong sunlight. In view of the ready availability, low cost and ease of handling of incandescent lamps, they are preferred for use as the illumination source.

The chlorination reaction is carried out by bubbling gaseous chlorine into the liquid $CF_3CH_2OCHF_2$ while it is strongly illuminated. The chlorine is added at the same rate at which it reacts which can be determined by checking for chlorine vapor in the effluent from the chlorinator. The reaction is exothermic so cooling water should be supplied to the chlorination apparatus to control the reaction. The chlorination can be carried out at any temperature from 15° C. up to the boiling point of the chlorination mixture. Best results are usually found at 15°–25° C. where the reaction rate is fast enough and the formation of byproducts does not present a serious problem.

The effluent from the chlorination apparatus should be passed through a water scrubber to dissolve the HCl which is formed. The chlorination should be continued until 1 mole of HCl per mole of starting ether is detected by titration of the dissolved HCl with a standard base. The extent of the chlorination can be controlled by the amount of chlorine bubbled through the ether and determined by the amount of effluent HCl. If too little HCl is evolved it indicates that the chlorination is not completed. If too much HCl is determined it indicates that polychloro products have been formed or that the ether has decomposed into undesirable chlorinated reaction products.

Following the chlorination the reaction mass can be separated by fractional distillation or by vapor phase chromatography.

The following examples will illustrate the procedural steps leading to the preparation of 1-chloro-2,2,2-trifluoroethyl difluoromethyl ether.

EXAMPLE 1

PREPARATION OF $CF_3CH_2OCHF_2$ AT ATMOSPHERIC PRESSURE

A solution of 400 g. (6.6 moles) of KOH pellets in 2,000 g. (20 moles) of trifluoroethanol was made in a 3-liter flask equipped with a stirrer, a water cooled condenser fitted with a "Dry-Ice" trap and a gas inlet bubbler tube. While the solution was heated at 70° C., 845 g. (9.8 moles) of difluorochloromethane were bubbled through the solution. The unreacted $CHF_2Cl$ and the product were collected in the "Dry-Ice" trap (a total of 978 g.). Upon low temperature fractional distillation of the contents of the trap, 312 g. (2.1 moles) of $CF_3CH_2OCHF_2$, b.p. 29°–30° C. at 760 mm., were recovered.

EXAMPLE 2

PREPARATION OF $CF_3CH_2OCHF_2$ UNDER PRESSURE

Into the stainless steel liner of a 1-gallon autoclave there was placed 420 g. (7 moles) of KOH pellets and 2,800 g. (28 moles) of $CF_3CH_2OH$. The autoclave was then sealed and while being stirred and heated at 60°–90° C., 606 ml. (7.7 moles) of liquefied $CHF_2Cl$ were added in increments to reach an autogenous pressure of 225 p.s.i.g. The autoclave was maintained at 90° C. for 4 hours after the addition of the reactants and was then cooled. The gases from the autoclave were then vented through a "Dry-Ice" trap to condense 389 g. of liquid. Low temperature fractional distillation gave 104 g. of $CF_3CH_2OCHF_2$, b.p. 29°–30° C. at 760 mm. The residue from the autoclave liner was fractionally distilled to yield an additional 366 g., making a total of 470 g. (3.1 moles) of $CF_3CH_2OCHF_2$.

EXAMPLE 3

PREPARATION OF $CF_3CH_2OCHF_2$ UNDER PRESSURE

A solution of 40 g. of NaOH pellets in 400 g. of trifluoroethanol was made with warming and poured into the liner of a 1-liter stirred autoclave which was sealed and pressure tested. A total of 85 ml. of liquid difluorochloromethane was added in 15 min. through a buret. The autoclave was heated at 90°–100° for 20 hr., the pressure dropping from a maximum of 231 p.s.i.g. to 170 p.s.i.g. The reaction was cooled to 50° C. and vented through a "Dry-Ice" trap to condense 34 g. of liquid.

The neutral contents of the liner were distilled to give 30.5 g., b.p. 28°–30° C., of crude $CF_3CH_2OCHF_2$ and an additional 11 g. of liquid in the trap. Low temperature distillation of the combined traps gave 20 g. of recovered difluorochloromethane and 25 g. more of $CF_3CH_2OCHF_2$. The $CF_3CH_2OCHF_2$ obtained with NaOH had the same boiling point as that obtained with KOH and showed the same maximum peak at 5.6–7.7 min. by vapor fractometry on a 10' DEGS "A" column.

EXAMPLE 4

PREPARATION OF $CH_3CH_2OCHF_2$ UNDER PRESSURE WITH ADDED

WATER

Into the stainless steel liner of a 1-liter autoclave there was placed a solution of 60 g. (1 mole) of KOH pellets in 374 g. (3.7 moles) of trifluoroethanol and 26 g. (1.4 moles) of water. The autoclave was then sealed and while being stirred and heated at 80°–95° C., 60 ml. (0.8 mole) of liquefied $CHF_2Cl$ were added in increments to reach an autogenous pressure of 115 p.s.i.g. The autoclave was maintained at approximately 90° C. for 2 hours after the addition of the reactants and was then cooled. The gases from the autoclave were then vented through a "Dry-Ice" trap condensing 13 g. of liquid. The contents of the liner were distilled to give 49 g. b.p. 27°–40° C. of crude $CF_3CH_2OCHF_2$ and an additional 27 g. of liquid in the trap. Low temperature distillation of the combined traps gave 24 g. of recovered difluorochloromethane and 16 g. more of $CF_3CH_2OCHF_2$. The combined product, 65 g., represents a 56.5 percent of the theoretical conversion of $CHF_2Cl$.

EXAMPLE 5

PREPARATION OF $CF_3CHClOCHF_2$

Into a small water-cooled chlorination apparatus equipped with a "Dry-Ice" trap there was placed 129 g. of $CF_3CH_2OCHF_2$. The apparatus was purged with nitrogen for 2 min. Gaseous chlorine was then bubbled through the liquid at 15° C. while it was illuminated with an incandescent light. The effluent HCl was titrated until approximately 1 mole of HCl was collected. The reaction product weighed 140 g., indicating an increase in weight of 11 g. The product was then distilled through a 60×2 cm. stainless steel packed column to give pure $CF_3CHClOCHF_2$; b.p. 48°–48.5° C. at 760 min., $N_D^{20}$ 1.3002. The structure $CF_3CHClOCHF_2$ was determined by elemental analysis, N.M.R. and infrared spectra.

In order to determine the potency of 1-chloro-2,2,2-trifluoroethyl difluoromethyl ether as an inhalation anesthetic in combination with oxygen a series of tests were carried out on both mice and dogs. The 1-chloro-2,2,2-trifluoroethyl difluoromethyl ether used was at least 99.5 percent pure as determined by vapor phase chromatography.

Groups of five mice were placed into a jar and exposed to a concentration of 1.25 percent by volume of 1-chloro-2,2,2-trifluoroethyl difluoromethyl ether. After an induction time of 1.65 minutes, which was free of excitation, the mice were anesthetized. During the period of anesthesia the mice showed no change in respiration and no visible untoward effects. The mice recovered in 1.1 minutes following removal from the jar and showed no aftereffects.

Groups of five more mice were then given a similar test with 2.5 percent by volume of the compound. After an induction time of 0.5 minutes an excellent anesthetic syndrome was produced. Anesthesia was deep and relaxation excellent. The induction period was very smooth with no apparent excitation. On removal from the jar the mice fully recovered in 2.35 minutes with no delayed deaths.

Four mongrel dogs weighing between 9.2 and 13.6 kgs. were anesthetized using a closed circuit infant inhalation set. An inhaled concentration of 2.5 to 3 percent of 1-chloro-2,2,2-trifluoroethyl difluoromethyl in pure oxygen was administered throughout the anesthesia. No premedication was used. The compound produced a smooth induction and uneventful recovery in the dogs. No excitation was noted during induction or recovery. The agent handled easily, most likely because of its low boiling point of 48.5° C. The desired anesthetic level was easily maintained, relaxation was excellent and analgesia was present until recovery. Some salivation was noted in two dogs during recovery; however, the agent did not appear to be irritating to the mucous membranes. No tremors or twitching were noted in any of the dogs.

While the dogs were in a surgical plane of anesthesia 10 gamma/kg. of epinephrine was administered intravenously. The electrocardiogram showed complete two to one and three to one heart block which did not last more than 4 minutes. The beats that came through were normal. In one dog there was partial inversion of the QRS complex which rapidly returned to normal. All dogs recovered rapidly and uneventfully from the epinephrine challenge. There were no signs of auricular or ventricular tachycardia or fibrillation in any of the dogs.

The compound 1-chloro-2,2,2-trifluoroethyl difluoromethyl ether exhibits excellent anesthetic properties in inhalation anesthetic susceptible mammals. The compound is nonflammable and soda lime stable. It lends itself to effective use as an inhalant anesthetic in respirable mixtures containing life-supporting concentrations of oxygen. In addition, studies with the agent have shown that it is highly potent, affords good muscular relaxation, is nontoxic, has a high margin of safety, affords rapid induction free of excitation and rapid recovery, affords ease of control of the level of anesthesia and is compatible with ancillary drugs commonly used in connection with anesthesia.

The effective amount of $CF_3CHClOCHF_2$ to be employed depends on the level of anesthesia to which the mammal is to be brought, the rate at which anesthesia is to be induced, and the length of time over which anesthesia is to be maintained. Volume percentages of $CF_3CHClOCHF_2$ in oxygen from a fraction of a percent up to several percent, can be employed. The person controlling the anesthesia can easily regulate the amount of $CF_3CHClOCHF_2$ to be used starting with a small mount of the ether and gradually increasing the amount until the desired plane of anesthesia is reached. By then monitoring the physical properties of the mammal, as is the usual procedure, the duration and plane of anesthesia can be readily controlled.

It should be understood that the foregoing disclosure relates only to a preferred embodiment of the invention and that it is intended to cover all changes and modifications of the example of the invention herein chosen for the purpose of the disclosure which does not constitute departure from the spirit and scope of the invention.

I claim:
1. A method of preparing $CF_3CHClOCHF_2$, comprising the following steps:
   a. dissolving alkali metal hydroxide in $CF_3CH_2OH$ and thereafter reacting $CHF_2Cl$ with the $CF_3CH_2OH$ and alkali metal hydroxide at a temperature from 0° to 150° C. to produce $CF_3CH_2OCHF_2$;
   b. distilling the reaction mixture from (a) to recover the $CF_3CH_2OCHF_2$;
   c. chlorinating $CF_3CH_2OCHF_2$ with chlorine gas in the presence of light and at a temperature of 15° C. up to the boiling point of the mixture to prepare $CF_3CHClOCHF_2$;
   d. separating the chlorinated mixture from (c) by distillation to recover $CF_3CHClOCHF_2$.

2. The process of preparing $CF_3CHClOCHF_2$ which comprises sequentially:
   a. reacting together $CF_3CH_2OH$, an alkali metal hydroxide and $CHF_2Cl$ at a temperature from 0° to 150° C. to prepare $CF_3CH_2OCHF_2$;
   b. separating the reaction mixture from (a) by distillation to recover $CF_3CH_2OCHF_2$;
   c. chlorinating $CF_3CH_2OCHF_2$ with chlorine at a temperature of 15° C. up to the boiling point of the mixture while exposing the reactants to photoenergy to prepare $CF_3CHClOCHF_2$ d. separating the chlorinated mixture from (c) by distillation to recover $CF_3CHClOCHF_2$.

3. A method of preparing $CF_3CHClOCHF_2$ which comprises sequentially:
   a. reacting together $CF_3CH_2OH$, an alkali metal hydroxide and $CHF_2Cl$ at a pressure from atmospheric up to 300 p.s.i. and at a temperature from 25°–100° C. to prepare $CF_3CH_2OCHF_2$;
   b. separating by distillation the reaction mixture from (a) to recover $CF_3CH_2OCHF_2$;
   c. chlorinating the $CF_3CH_2OCHF_2$ recovered in step (b) with chlorine gas in the presence of light at a temperature from 15° C. up to the boiling point of the mixture to prepare $CF_3CHClOCHF_2$;
   d. separating by distillation the chlorinated mixture from (c) to recover $CF_3CHClOCHF_2$.

4. The method of claim 1 wherein step (a) is carried out in the presence of added water.

* * * * *

UNITED STATES PATENT OFFICE
CERTIFICATE OF CORRECTION

Patent No. 3,637,477  Dated January 25, 1972

Inventor(s) Louise S. Croix

It is certified that error appears in the above-identified patent and that said Letters Patent are hereby corrected as shown below:

Col. 4, line 16, "$CH_3CH_2OCHF_2$" should read -- $CF_3CH_2OCHF_2$ --.

Col. 5, line 46, "mount" should read -- amount --.

Col. 6, line 31, the portion beginning with "d. etc." should be indented and in line with paragraph c.

Signed and sealed this 15th day of August 1972.

(SEAL)
Attest:

EDWARD M. FLETCHER, JR.
Attesting Officer

ROBERT GOTTSCHALK
Commissioner of Patents